Patented May 6, 1947

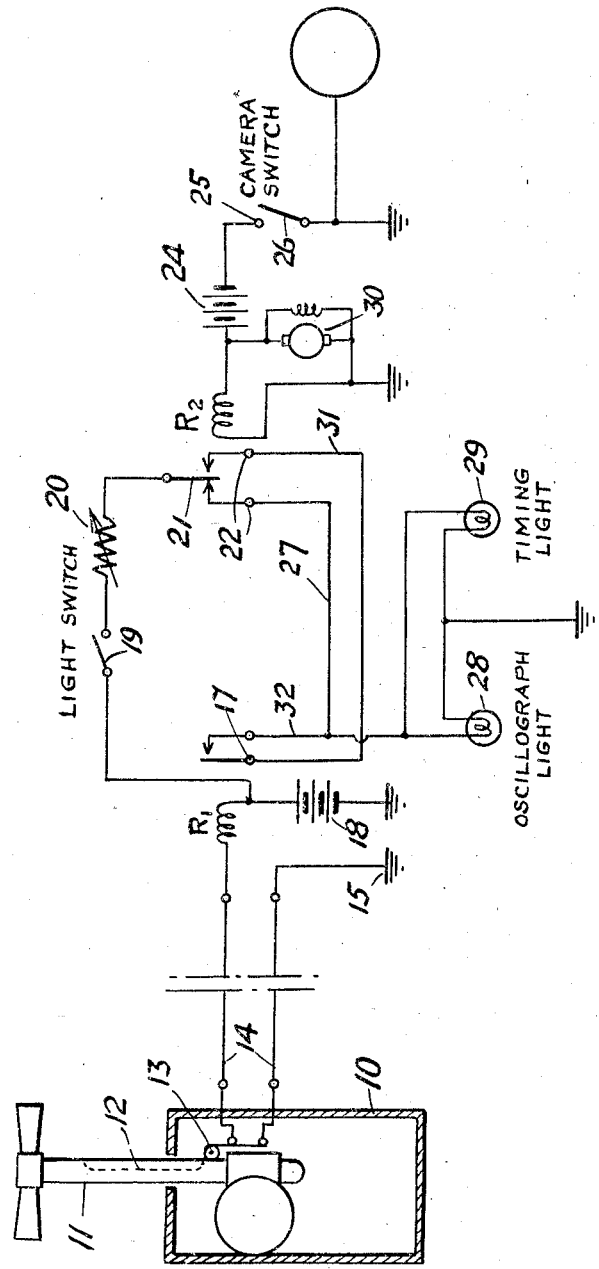

2,420,025

UNITED STATES PATENT OFFICE 2,420,025

VIBRATION RECORDER

Wayne W. Young, Beaumont, Tex., assignor to Sun Oil Company, Philadelphia, Pa., a corporation of New Jersey Application November 30, 1945, Serial No. 632,033

4 Claims. (Cl. 234—61)

This invention relates to geophysical exploration and the art of vibration recording in which vibration apparatus embodying a moving film or tape camera is used to record indications of vibrations as obtained on an oscillograph screen and more particularly to an improved relay circuit for operating the camera and illuminating the oscillograph screen in timed relation to the operation of the handle of a blasting machine or the like which may be used to detonate an explosion, the vibration effects of which it is desired to record for future study.

In undertaking many of the various geophysical explorations so essential to the continued discovery of new oil wells for the oil well industry it has been common practice in the past to detonate an explosive charge deep in the earth and simultaneously record for future study the vibration effects of the explosion as they reach the earth's surface. These vibration effects may be indicated on an oscillograph or oscilloscope screen and it has also been the practice in the past to provide sufficient illumination for the oscillograph screen to permit it to be photographed and recorded on the film or tape of a moving picture camera or recorder.

It has now been found desirable in connection with vibration recording apparatus to operate the camera and illuminate the oscillograph screen in timed relation to each other and to the explosion so as to provide for a blank space on the recording tape or film before the recordings of the vibrations to thus enable an identification stamp or the like to be placed on the record. Therefore, the relay circuit of this invention has been devised.

It is a principal object of this invention to provide a vibration recording apparatus with an improved relay circuit which may be used in conjunction with a modified blasting machine handle to enable the automatic operation in proper sequence and timed relation to each other of the recording camera and electrical illuminating means for the oscillograph screen and timing devices so that the camera motor will be operated a short time before the oscillograph screen is sufficiently illuminated to provide the necessary illumination for photographing and recording the vibration indications from the oscillograph screen.

It is also an object of this invention to provide the relay circuit for sequentially operating the recording camera and oscillograph electric illuminating means with additional relay controlled means to electrically illuminate the oscillograph screen for adjustment purposes prior to the operation of the camera together with automatic means for disconnecting the electric illuminating means upon starting the operation of the camera and before operating the blasting machine handle.

Further objects and advantages of this invention will be apparent upon reference to the following specification and drawings in which the sole figure is a schematic wiring diagram of the improved relay circuit.

Referring to the drawing, a conventional blasting machine 10 is provided with the usual rack bar or operating handle 11. In this invention, however, the handle 11 is modified to provide the longitudinal groove or cam surface 12 which cooperates with a single pole, single throw switch 13 in such manner that the contacts of the switch are closed when the handle 11 is raised to the position shown and are opened when the handle is lowered to detonate an explosive. It should be obvious that various means of operating the switch 13 and handle 11 may be used. The contacts of the switch 13 are connected by a two wire cable 14, of suitable length, to the relay circuit and mechanism which may be contained at a remote position in an instrument truck or the like. One of the contacts of switch 13 is connected to a common conductor 15 or terminal of the relay circuit which may be grounded as shown while the other contact is connected to the relay operating coil $R_1$ of the relay 17 and in series with a source of potential or battery 18 and the common ground 15. The relay 17 will be preferably of the single pole, single throw, normally closed contact type. When the relay coil $R_1$ is energized with the operating handle 11 in the position, as shown, and with the contacts of switch 13 closed, the movable and fixed contacts of relay 17 are moved to the open position as shown.

A manually operated single pole, single throw switch 19 is connected in series with the positive terminal of the battery 18 and a rheostat 20 is connected in series with the movable contact 21 of a single pole, double throw relay 22. An operating coil $R_2$ for relay 22 is connected in a circuit in series with a source of potential such as battery 24 and contact 25 of the camera switch 26 in such manner that upon closing switch 26 the relay coil $R_2$ will be energized. The relay 22 is so arranged in the circuit that its normal or unenergized position is to connect the movable contact 21 to the conductor 27 in such manner that with the light switch closed the oscillograph light 28 and timing light 29 will be in circuit with the battery 18 and illuminated while the degree of illumination is controlled by the rheostat 20. The camera motor 30 preferably is connected in parallel with relay coil R2 and when the camera switch 26 is closed the relay coil R2 and camera motor 30 will both be energized and the movable contact 21 of relay 22 will be connected with conductor 31 which in turn controls the movable contact of relay 17. Since the fixed contact of relay 17 is connected through conductor 32 to the oscillograph and timing lights 28 and 29 they will become de-energized at this time.

In operating the relay circuit of this invention the handle 11 of the blasting machine 10 is first raised to the position shown to energize the relay coil R1 and move the contacts of relay 17 to the position shown to break the circuit between conductors 31 and 32. At this time the camera switch 26 is in its open position also as shown. The recording operator in the instrument truck may then close the manual switch 19 which completes a circuit from the battery 18 through the rheostat 20, relay 22 and conductor 27 to illuminate the oscillograph and timing lights 28 and 29 and thus permit any adjustments to be made to the instruments. Thereafter, camera switch 26 can be closed to complete the camera motor circuit and start the operation of the camera while at the same time energizing the relay coil R2 to move the relay contact 21 and disconnect the circuit through conductor 27 to the lights 28 and 29 and connect the battery 18 to conductor 31 which operates the camera motor 30 while the timing and oscillograph lights are turned off. Thus, any record of the oscillograph screen is prevented from being photographed on the camera film or tape then moving through the camera and a blank space is provided on the film. The blasting handle 11 is then lowered to detonate the explosive and while switch 13 rides in the cam groove 12 the switch contacts are opened to break the circuit of relay coil R1 and permit the movement of the contacts of relay 17 to their normally closed position which completes a circuit to the lights 28 and 29, conductor 32 to conductor 31 which has been previously connected to the battery 18 by the operation of the camera switch 26 and relay R2. Therefore it will be seen that the oscillograph and timing lights 28 and 29 are energized and illuminated at the time of the explosion to permit the photographing and recording on the camera film of the vibration indications from the oscillograph screen. At the end of the recording period the light switch 19 and the camera switch 26 are then opened to condition the relay circuit for the next recording operation.

What I claim and desire to protect by Letters Patent is:

1. Vibration recording apparatus comprising in combination, a blasting machine having an operating handle movable to and from a detonating position, an oscillograph adapted to indicate the presence of vibration, means including a source of current and lights to electrically illuminate for photographic purposes said oscillograph indications, a camera adapted to record on moving film said oscillograph indications, relay circuit means for controlling the operation of said camera and said electric illumination means, said relay circuit means including a manually operable switch for simultaneously operating a relay and said camera, said relay being operable to disconnect said lights from said source of current, and a second relay being operable in response to the movement of said blasting machine handle to its detonating position to connect said lights to said source of current and provide illumination of said oscillograph indications.

2. Vibration recording apparatus comprising in combination, a blasting machine having an operating handle movable to and from a detonating position, an oscillograph adapted to indicate the presence of vibration, means including a source of current and lights to electrically illuminate for photographic purposes said oscillograph indications, a camera adapted to record on moving film said oscillograph indications, relay circuit means for controlling the operation of said camera and said electric illumination means, said relay circuit means including a manually operable switch for simultaneously operating a relay and said camera, said relay being adapted to disconnect said lights from said source of current, and a second relay being operable in response to the movement of said blasting machine handle to its detonating position to connect said lights to said source of current and provide illumination of said oscillograph indications.

3. Vibration recording apparatus comprising in combination, a blasting machine having an operating handle movable to and from a detonating position, an oscillograph adapted to indicate the presence of vibration, means including a source of current and lights to electrically illuminate for photographic purposes said oscillograph indications, a camera adapted to record on moving film said oscillograph indications, relay circuit means for controlling the operation of said camera and said electric illumination means, said relay circuit means including a manually operable switch for simultaneously operating a relay and said camera, the operation of said relay being adapted to disconnect said lights from said source of current, and a second relay controlled by a switch on said blasting machine and operable in response to the movement of said blasting machine handle to its detonating position to connect said lights to said source of current and provide illumination of said oscillograph indications.

4. Vibration recording apparatus comprising in combination, a blasting machine having an operating handle movable to and from a detonating position, an oscillograph adapted to indicate the presence of vibration, means including a source of current and lights to electrically illuminate for photographic purposes said oscillograph indications, a camera adapted to record on moving film said oscillograph indications, relay circuit means for controlling the operation of said camera and said electric illumination means, said relay circuit means including a manually operable switch for connecting said lights to said battery, a second manually operable switch for simultaneously operating a relay and said camera, the operation of said relay being adapted to disconnect said lights from said source of current, and a second relay controlled by a switch on said blasting machine and operable in response to the movement of said blasting machine handle to its detonating position to connect said lights to said source of current and provide illumination of said oscillograph indications.

WAYNE W. YOUNG.